United States Patent
Burkart et al.

(10) Patent No.: US 8,091,821 B2
(45) Date of Patent: Jan. 10, 2012

(54) METHOD FOR CONTROLLING AN ELECTRIC BELT RETRACTOR, AND AN ELECTRIC BELT RETRACTOR

(75) Inventors: Rainer Burkart, Alfdorf (DE); Thomas Busch, Shelby Township, MI (US)

(73) Assignee: TRW Automotive GmbH, Alfdorf (DE)

( * ) Notice: Subject to any disclaimer, the term of this patent is extended or adjusted under 35 U.S.C. 154(b) by 1168 days.

(21) Appl. No.: 11/401,558

(22) Filed: Apr. 11, 2006

(65) Prior Publication Data

US 2006/0231663 A1 Oct. 19, 2006

(30) Foreign Application Priority Data

Apr. 14, 2005 (DE) .......................... 10 2005 017 282

(51) Int. Cl.
*B65H 75/48* (2006.01)
*B60R 22/44* (2006.01)
*B60R 22/46* (2006.01)

(52) U.S. Cl. ............... 242/390.8; 242/374; 242/384; 297/477; 280/807

(58) Field of Classification Search ............... 242/391.2, 242/390.8, 374, 390.2; 297/477–479; 280/806–807
See application file for complete search history.

(56) References Cited

U.S. PATENT DOCUMENTS

| | | | | |
|---|---|---|---|---|
| 6,447,012 B2 * | 9/2002 | Peter et al. | ........................ | 280/806 |
| 6,485,057 B1 * | 11/2002 | Midorikawa et al. | ......... | 280/807 |
| 6,499,554 B1 * | 12/2002 | Yano et al. | ...................... | 180/268 |
| 6,604,597 B2 * | 8/2003 | Fujii et al. | ..................... | 180/268 |
| 6,726,249 B2 * | 4/2004 | Yano et al. | ...................... | 280/805 |
| 2003/0094534 A1 * | 5/2003 | Fujii et al. | .................. | 242/390.9 |
| 2004/0021029 A1 | 2/2004 | Eberie et al. | | |
| 2004/0056471 A1 * | 3/2004 | Bullinger et al. | ............. | 280/806 |
| 2004/0113409 A1 * | 6/2004 | Ingemarsson et al. | ........ | 280/806 |
| 2007/0057107 A1 * | 3/2007 | Burkart | ........................ | 242/374 |

FOREIGN PATENT DOCUMENTS

| | | |
|---|---|---|
| DE | 19731689 | 2/1999 |
| DE | 10136267 | 2/2002 |
| DE | 10204477 | 8/2003 |

* cited by examiner

*Primary Examiner* — Michael Mansen
*Assistant Examiner* — Stefan Kruer
(74) *Attorney, Agent, or Firm* — Tarolli, Sundheim, Covell & Tummino LLP

(57) ABSTRACT

A method for controlling an electric belt retractor (16) which has an electric motor (20) which can drive a belt spool (18) in a belt band retraction direction and/or in a belt band withdrawal direction, and a blocking catch which is able to be guided into blocking teeth in order to block a rotation of the belt spool (18) in the belt band withdrawal direction, comprises the following steps:

Operating the electric motor (20) in belt band retraction direction for tensioning the belt band (26);
Detecting a possible belt band withdrawal;
Determining a stable vehicle state; and
Re-operating the electric motor (20) in belt band retraction direction only when a belt band withdrawal is detected.

13 Claims, 4 Drawing Sheets

METHOD FOR CONTROLLING AN ELECTRIC BELT RETRACTOR, AND AN ELECTRIC BELT RETRACTOR

TECHNICAL FIELD

The invention relates to a method for controlling an electric belt retractor. The invention further relates to an electric belt retractor.

BACKGROUND OF THE INVENTION

An electric belt retractor having a belt spool which is coupled to an electric motor and can be driven in the direction of belt retraction and/or belt withdrawal, is part of a vehicle occupant restraint system with which various precautions can be taken on detection of a critical vehicle situation in order to protect a vehicle occupant from negative consequences in the best possible way. The steps taken may comprise, for example, changing the inclination of a back rest of a vehicle seat, closing vehicle windows, pre-tensioning the safety belt and further measures. All these measures are reversible and repeatable; as soon as the vehicle is in a stable state again, the vehicle is returned into its initial state.

As regards the belt retractor, this means that the safety belt, which was wound up by the electric motor on detection of a critical vehicle situation in order to eliminate the so-called belt slack in the safety belt as largely as possible, is released again as soon as the vehicle state which was detected as being critical is no longer present.

During or after the tensioning process, a vehicle-sensitive blocking of the belt spool can occur, for example with a braking of the vehicle. In a belt retractor with a vehicle-sensitive blocking catch, this means a complete steering in of the blocking catch into blocking teeth such that a rotation of the belt spool is blocked in the belt band withdrawal direction. The blocking teeth are usually undercut and therefore exert a force drawing the blocking catch into the blocking teeth on stressing, so as to be able to reliably transfer the high blocking forces which prevail in an accident between the blocking teeth and the blocking catch.

In order to make it possible for the vehicle occupant to subsequently extract belt band again when the vehicle state which was detected as being critical is no longer present, the blocking catch which was steered in. must be released from the blocking teeth (unlocking). For this, a further brief operating of the electric motor is necessary in the belt band retraction direction, in order to turn the belt spool with the blocking teeth (or with the blocking catch) about a particular angle such that the blocking catch can fall out from the blocking teeth. The unlocking operation of the electric motor is terminated by means of a sensor on reaching a predetermined angle.

The rotation of the belt spool causes an additional belt band retraction, which is felt to be uncomfortable by the vehicle occupant. However, the unlocking operation of the electric motor takes place independently of whether the blocking catch was in fact drawn into the blocking teeth or not, because the state of the blocking catch is not monitored. This means that the vehicle occupant in any case comes to feel an additional rise in the belt band force after a tensioning of the belt, although this is unnecessary in many cases.

It is an object of the invention to provide an electric belt retractor with reduced stress and improved comfort for the vehicle occupant.

BRIEF SUMMARY OF THE INVENTION

According to the invention, method for controlling an electric belt retractor, the belt retractor having an electric motor which is able to drive a belt spool in a belt band retraction direction and/or in a belt band withdrawal direction, and having a blocking catch which is able to be guided into blocking teeth, in order to block a rotation of the belt spool in the belt band withdrawal direction, comprises the following steps:

Operating the electric motor in the belt band retraction direction to tension the belt band;

Detecting a possible belt band withdrawal;

Determining a stable vehicle state; and

Re-operating the electric motor in the belt band retraction direction only when a belt band withdrawal is detected.

The invention is based on the finding that the blocking catch can only be drawn into the blocking teeth during a belt band withdrawal, but not during a retraction of belt band or when the belt band is stationary. The invention therefore makes provision for an unlocking operation of the electric motor only when the prerequisite exists for a blocking catch drawn into the blocking teeth. In all other cases, the vehicle occupant is spared an additional increase in the belt band force, because it can be safely assumed that an unlocking is not necessary.

According to a further development of the invention, the extension of belt band is also determined quantitatively. Thereby, the unlocking operation of the electric motor can be adapted to the extent of the belt band withdrawal. This makes it possible to keep the force increase in the belt band as low as possible. Belt band withdrawal and belt band retraction does not necessarily mean here the length of the unwound or wound belt band, but rather the extent of the rotation of the motor shaft of the gear components or of the belt spool.

In order to be sure that the blocking catch can in fact fall out from the blocking teeth, provision is made that with the re-operation of the electric motor in the belt band retraction direction, a retraction of belt band takes place, the amount of which is at least as great as the amount of the previously determined belt band withdrawal, but not greater than a predetermined maximum amount.

The invention also provides an electric belt retractor with a control arrangement to carry out the method according to the invention.

DETAILED DESCRIPTION OF THE PREFERRED EMBODIMENTS

An electric belt retractor for a vehicle occupant restraint system comprises, as described in the introduction, a belt spool which is usually coupled to an electric motor via a reduction gear, and a blocking mechanism with a vehicle-sensitive blocking catch which is able to be guided into undercut blocking teeth.

Figure 1:
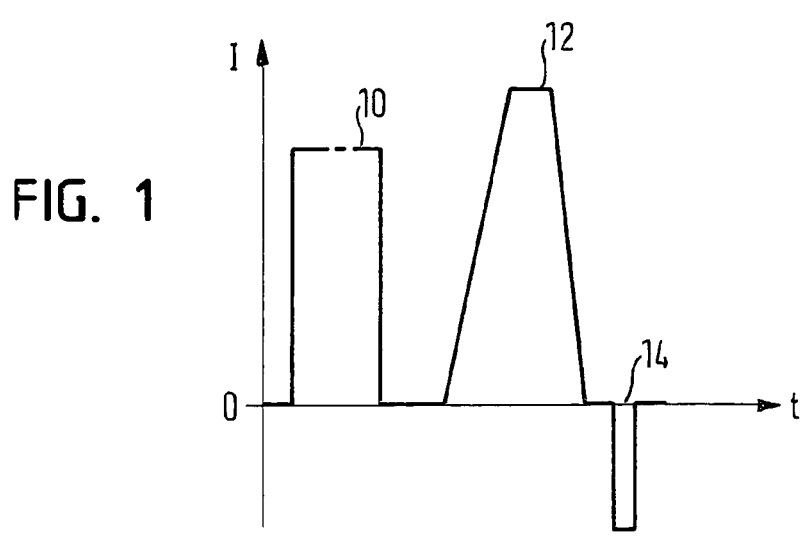
FIG. 1 shows a diagram with current impulses which occur during the controlling of an electric belt retractor.

In FIG. 1, typical current impulses are shown which occur during the controlling of an electric belt retractor in a critical vehicle state. Firstly, the electric motor is provided with current over a period of time which is necessary for tensioning the belt band (tensioning impulse 10). If a stable vehicle state is then detected, an unlocking impulse 12 occurs in order to release the blocking catch, which may possibly have been guided in, out from the blocking teeth. After this, in addition a coupling release impulse 14 occurs.

In contrast to known methods, the method according to the invention for controlling an electric belt retractor provides for the detecting of a possible belt band withdrawal during the critical vehicle state. The unlocking impulse 12 only takes place when a belt band withdrawal has been established.

FIGS. 2 to 8 show various embodiments of an electric belt retractor with an electric motor 20 coupled to a belt spool 18, and with an electronic control unit 22 for the electric motor 20 and a belt band withdrawal sensor 24 connected with the electronic control unit 22. The belt retractors 16 are suitable for carrying out the method according to the invention and, in addition, allow the belt band withdrawal to be determined quantitatively.

The quantitative determining of the belt band withdrawal is used for the unlocking operation of the electric motor, by a belt band retraction taking place, the amount of which is at least as great as the amount of the previously determined belt band withdrawal, but not greater than a predetermined maximum amount. The amount of the belt band retraction preferably exceeds the amount of the belt band withdrawal by a predetermined tolerance amount.

Figure 2:
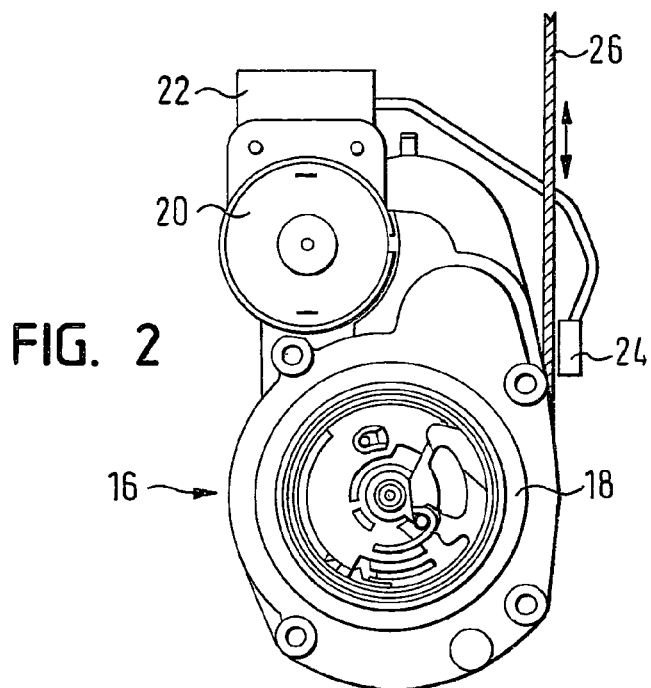
FIG. 2 shows a first embodiment of the belt retractor according to the invention.

The various embodiments are characterized briefly below:

FIG. 2: The belt band withdrawal sensor 24 is an optical sensor which detects the movement of the belt band 26.

Figure 3:
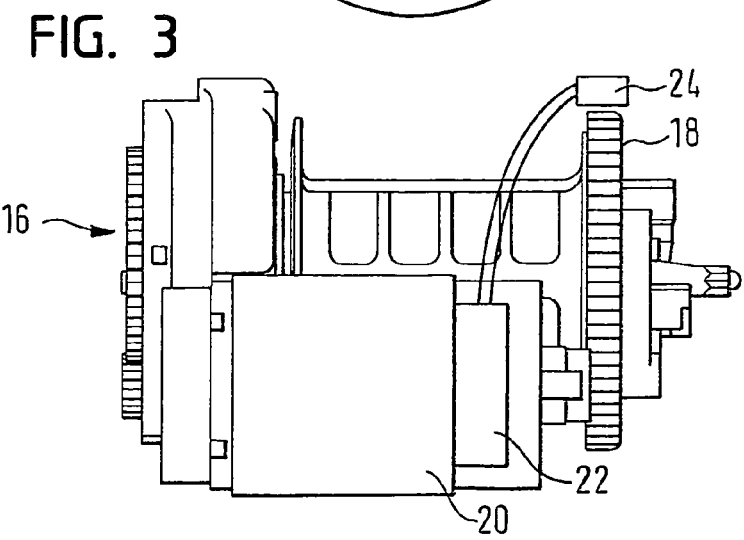
FIG. 3 shows a second embodiment of the belt retractor according to the invention.
Figure 4:
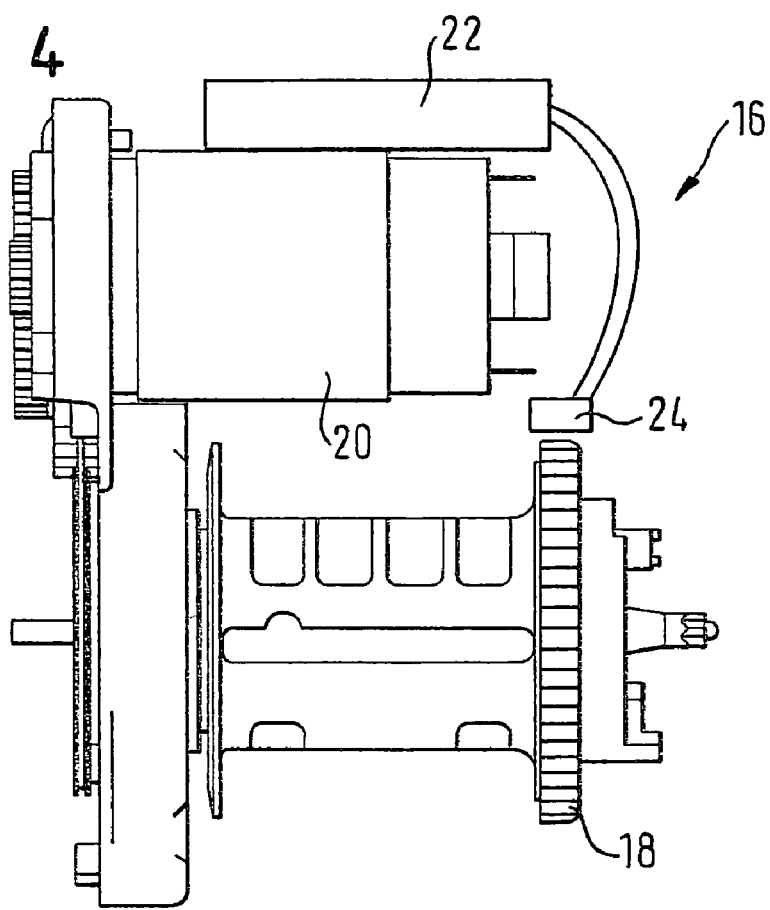
FIG. 4 shows a third embodiment of the belt retractor according to the invention.

FIGS. 3 and 4: The belt band withdrawal sensor 24 is an optical sensor which detects the rotation of the marked belt spool 18 or of a component driven by the belt spool 18.

Figure 5:
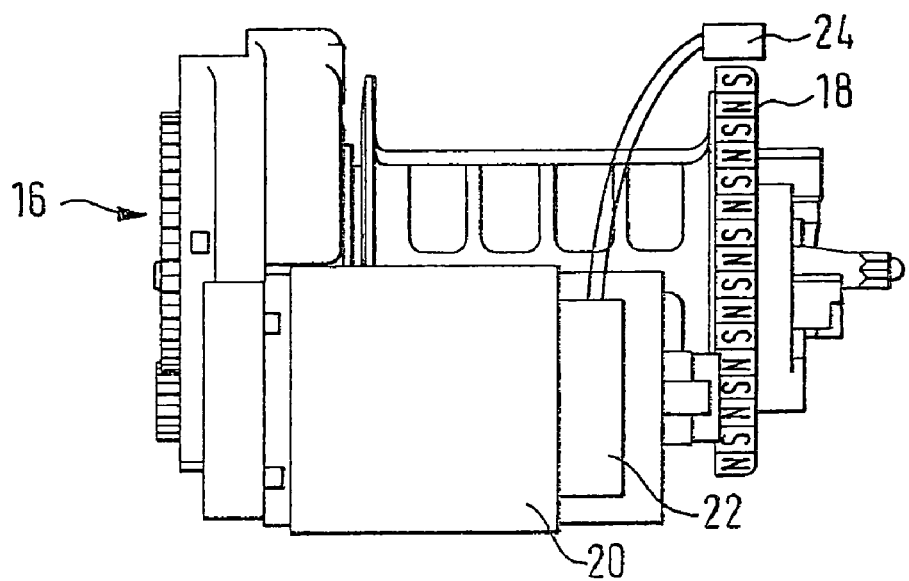
FIG. 5 shows a fourth embodiment of the belt retractor according to the invention.

FIG. 5: The belt band withdrawal sensor 24 is a magnetic sensor which detects the rotation of the (partially) magnetized belt spool 18 or of a (partially) magnetized component driven by the belt spool 18.

Figure 6:
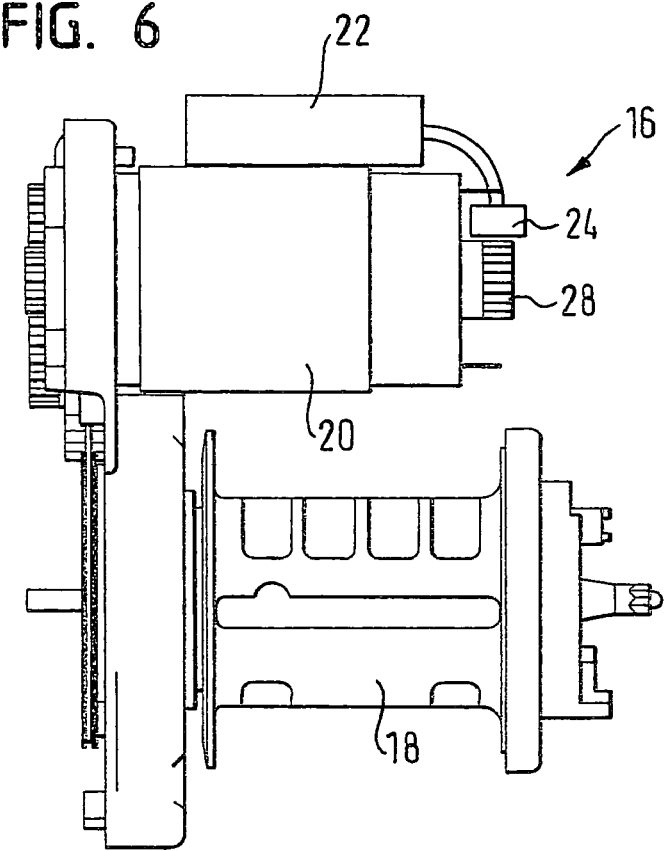
FIG. 6 shows a fifth embodiment of the belt retractor according to the invention.

FIG. 6: The belt band withdrawal sensor 24 is an optical sensor which detects the rotation of the marked motor shaft 28 or of a marked component arranged on the motor shaft 28 or driven by the motor shaft 28.

Figure 7:
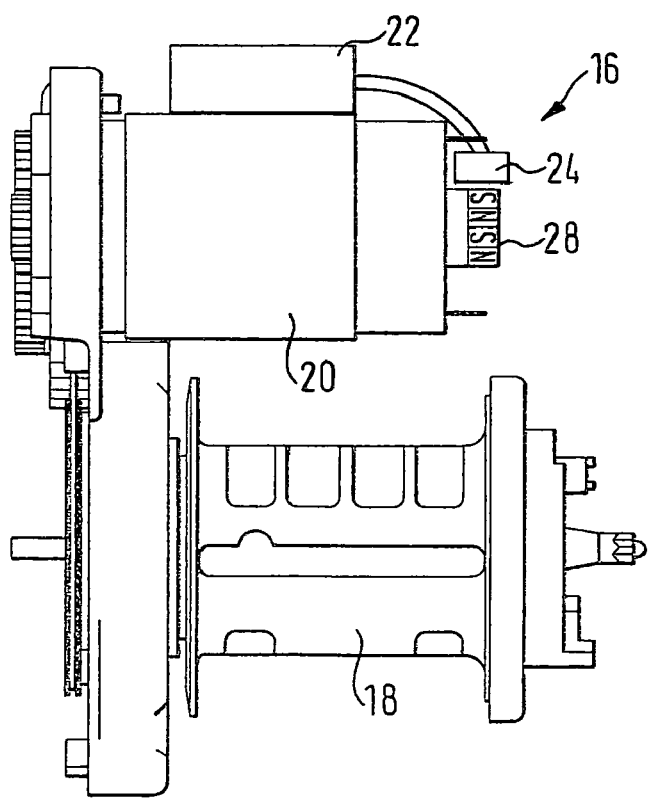
FIG. 7 shows a sixth embodiment of the belt retractor according to the invention.

FIG. 7: The belt band withdrawal sensor 24 is a magnetic sensor which detects the rotation of the magnetized motor shaft or of a magnetized component arranged on the motor shaft or driven by the motor shaft, e.g. mounted ring 28.

Figure 8:
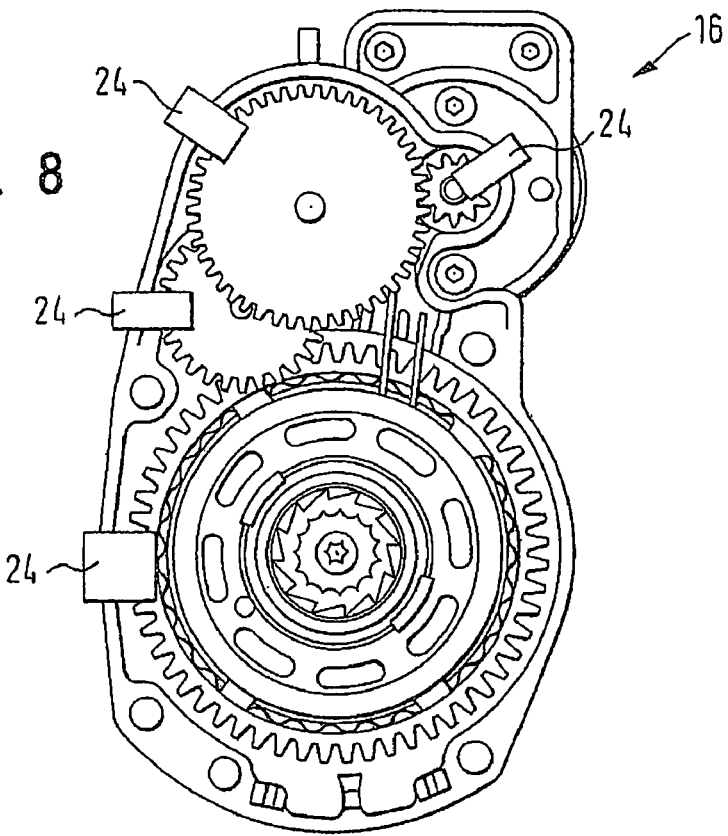
FIG. 8 shows a seventh embodiment of the belt retractor according to the invention.

FIG. 8 shows a belt retractor 16 in which the electric motor is coupled to the belt spool via a reduction gear having several toothed wheels. In this case, the belt band withdrawal can also be determined by detecting the rotation of one of the toothed wheels or of a component driven by a toothed wheel. Reference number 24 designates various positions at which a belt band withdrawal sensor can be arranged. The belt band withdrawal sensor may be an optical or magnetic sensor, which responds to suitable optical markings or to a suitable magnetizing of the corresponding toothed wheel or of a component driven by the toothed wheel.

The respective state of the vehicle is determined respectively by means of the electronic control unit 22 of the belt retractor 16. For this, signals are supplied in prepared form from vehicle sensors to an algorithm which runs in a processor of the electronic control unit 22.

Figure 9:
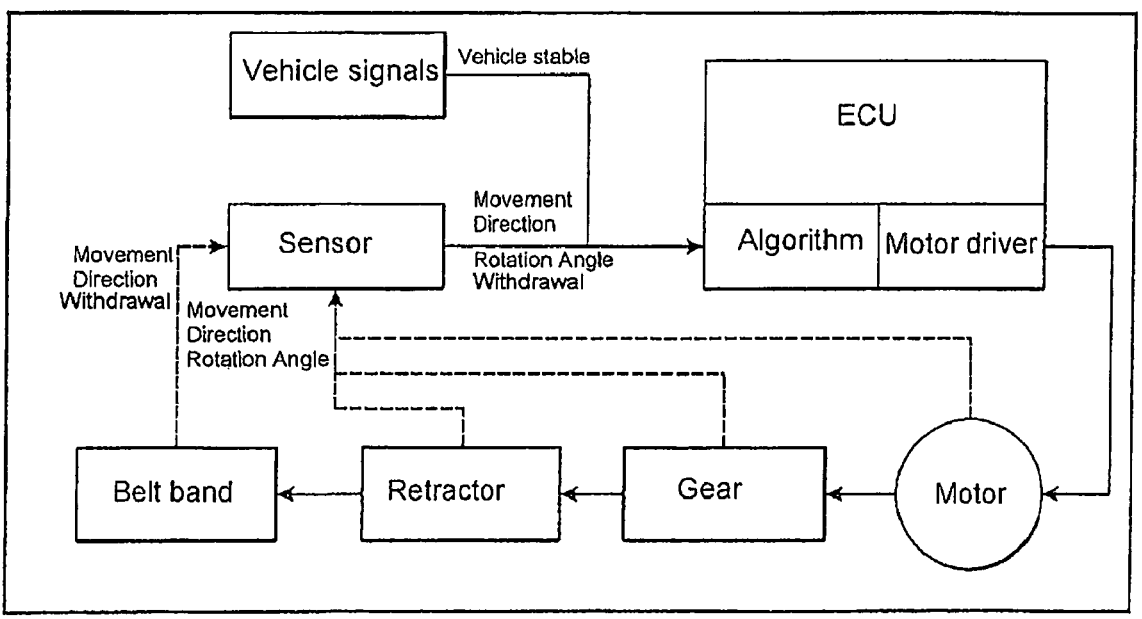
FIG. 9 shows a block diagram of the belt retractor according to the invention.

FIG. 9 summarizes in a block diagram the controlling of a belt retractor 16 according to the invention, with the alternative possibilities for detecting the belt band withdrawal.

The invention claimed is:

1. A method for controlling an electric belt retractor, the belt retractor having an electric motor, which can drive a belt spool in a belt band retraction direction and/or in a belt band withdrawal direction, and a blocking catch which is able to be guided into blocking teeth in order to block a rotation of the belt spool in the belt band withdrawal direction, the method comprising the following steps:
 (i) Operating the electric motor in the belt band retraction direction to tension a belt band;
 (ii) Detecting a possible belt band withdrawal following the tensioning of the belt band;
 (iii) Determining a stable vehicle state; and
 (iv) Performing an unlocking operation of the electric motor in order to release a blocking catch only when a belt band withdrawal is detected after the tensioning of the belt band, the step of performing the unlocking operation including re-operating the electric motor in the belt band retraction direction.

2. The method according to claim 1, wherein the belt band withdrawal is determined quantitatively.

3. The method according to claim 2, wherein with re-operating the electric motor in the belt band retraction direction, a belt band retraction takes place, the amount of which is at least as great as the amount of the previously determined belt band withdrawal.

4. The method according to claim 3, wherein the amount of the belt band retraction is not greater than a predetermined maximum amount.

5. The method according to claim 3, wherein the amount of the belt band retraction exceeds the amount of the belt band withdrawal by a predetermined tolerance amount.

6. The method according to claim 1, wherein a control arrangement carries out steps (i) through (iv).

7. The method according to claim 6, further comprising controlling the electric motor with an electronic control unit and detecting belt band withdrawal with a belt band withdrawal sensor connected with the electronic control unit.

8. The method according to claim 7, further comprising providing a belt band withdrawal sensor that permits a quantitative determining of the belt band withdrawal.

9. The method according to claim 7, further comprising detecting a movement of the belt band with the belt band withdrawal sensor.

10. The method according to claim 7, further comprising detecting a rotation of the belt spool or of a component coupled to the belt spool with the belt band withdrawal sensor.

11. The method according to claim 7, further comprising coupling the electric motor to the belt spool via a gear, and detecting a rotation of a component of the gear or of a member coupled to a component of the gear with the belt band withdrawal sensor.

12. The method according to claim 7, further comprising providing an optical sensor for the belt band withdrawal sensor.

13. The method according to claim 7, further comprising providing a magnetic sensor for the belt band withdrawal sensor.

\* \* \* \* \*